United States Patent [19]

DeLuca

[11] 4,202,026
[45] May 6, 1980

[54] ELECTRODE FOR TELEPHONE PROTECTOR MODULES

[75] Inventor: Paul V. DeLuca, Port Washington, N.Y.

[73] Assignee: Porta Systems Corp., Syosset, N.Y.

[21] Appl. No.: 953,880

[22] Filed: Oct. 23, 1978

[51] Int. Cl.² ............................................. H02H 3/22
[52] U.S. Cl. .................................... 361/119; 313/217
[58] Field of Search ...................... 361/117, 119, 126; 313/217

[56] References Cited

U.S. PATENT DOCUMENTS

| 1,765,531 | 6/1930 | Howard et al. | 361/119 X |
| 3,252,038 | 5/1966 | Colvesbert et al. | 361/126 X |
| 3,703,665 | 11/1972 | Yerance et al. | 361/126 |
| 4,013,927 | 3/1977 | Gilberts | 361/119 |
| 4,128,855 | 12/1978 | Gilberts | 361/119 |

Primary Examiner—Harry E. Moose, Jr.
Attorney, Agent, or Firm—Charles E. Temko

[57] ABSTRACT

An improved electrode construction for use in telephone protector modules, characterized in at least one of the pair of electrodes having an operative surface thereon defining a plurality of radially extending, generally pie-shaped sections forming plateau areas separated by radially extending grooves which serve to collect eroded particles and provide a means for venting the particles from the air gap separating the pair of electrodes. A centrally disposed circular recess joins the grooves and enables the venting action to be distributed to each of the grooves upon firing.

4 Claims, 5 Drawing Figures

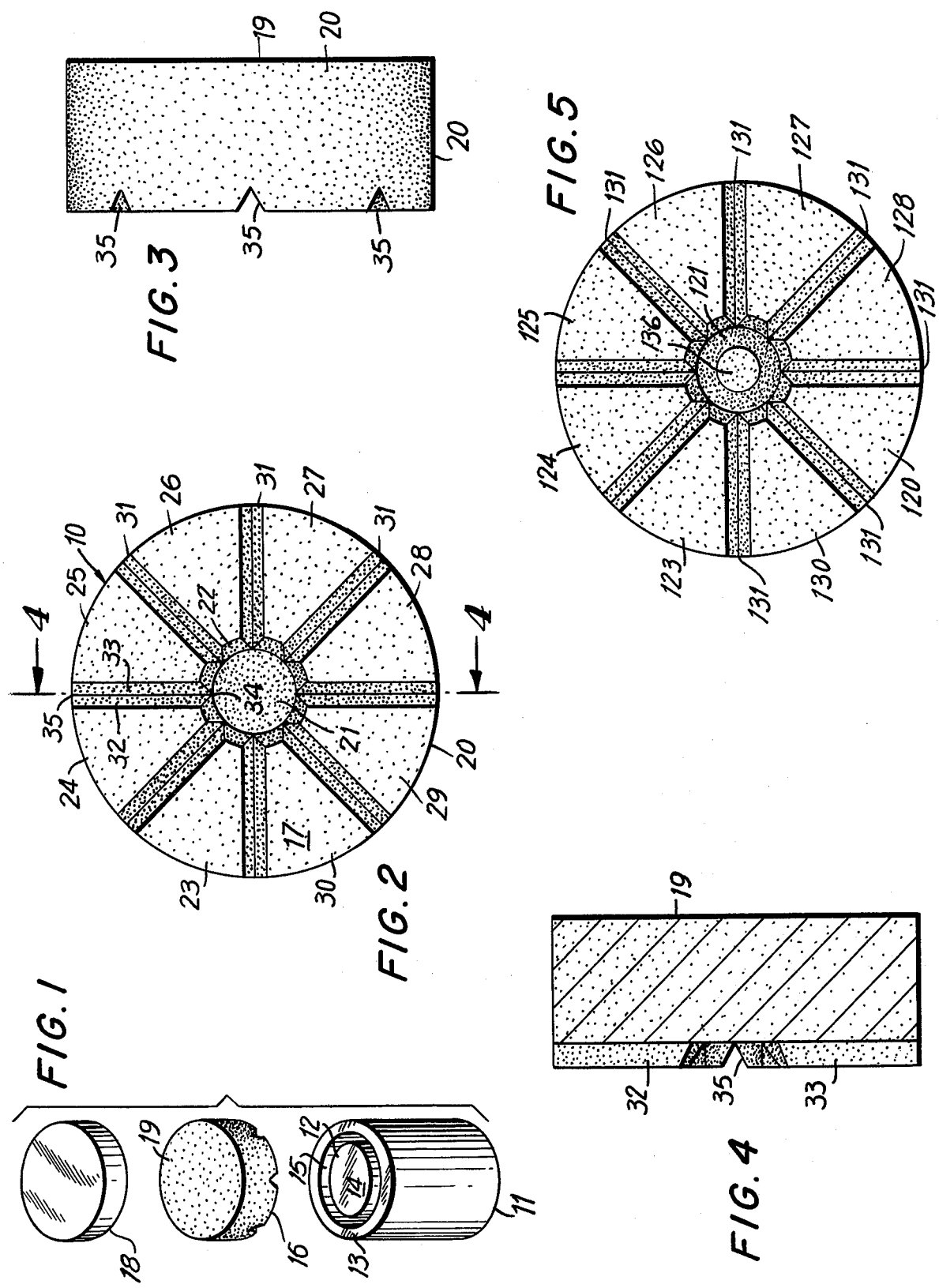

ELECTRODE FOR TELEPHONE PROTECTOR MODULES

BACKGROUND OF THE INVENTION

This invention relates generally to the field of telephone protector modules of the type used in conjunction with individual telephone subscriber circuits to protect the same against the deleterious effects of excessive voltage and corresponding amperage, which, if not grounded, can extensively damage the telephone system.

Such devices are well-known in the art, and almost all include a component having a pair of carbon electrodes which are placed in mutually spaced relation to define an air gap. One electrode is connected to a source of ground potential, and the other electrode is connected to an individual subscriber line. When excessive voltages are placed upon the line, the current temporarily arcs over the gap to ground potential. When the condition causing the excessive current terminates, the gap provides a means for insulating normal currents from ground potential and prevents current leakage. Such devices, sometimes referred to as spark gap arrestors, have proven effective within a relatively limited life span. Rural electrification authority standards existing for some time have required a useful average life of 40 firings before failure. Most conventional carbon electrodes do not achieve this goal, despite considerable research involving such factors as the quality of carbon from which the electrodes are formed, the type of binding material employed during manufacture, and subsequent treatment to reduce the tendency to disintegrate.

It has been established that electrode failure is attributed to two major factors, one being the presence of excessive humidity between the electrode surfaces during firing. This problem has been somewhat alleviated by the post-fabricating step of dipping the electrodes in dilute solution of propylene glycol or other dilute sealants to cause a thin film of a wax-like coating to at least partially seal the exposed and internal surfaces of the carbon particles comprising the electrode.

More serious is the gradual degradation of the electrode surface caused by upheaval and fission of the electrode surfaces occuring during the generation of heat incident to arcing.

Some progress has been made in ameliorating this problem. As disclosed in U.S. Pat. No. 3,703,665; granted Nov. 21, 1972 to Robert A. Yerance, et al, it has been found that the creation of raised plateaus separated by grooves on the operative face of at least one electrode, permits the venting of the air gap allowing the discharge of carbon particles which have been loosened under erosion caused by arcing when the device is in operation. The heat generated expands air disposed within the gap, the air blowing the loosened particles through the passageways formed by the grooves. This teaching also refers to specific depths of grooves in relation to gap distance between the electrodes for the purpose of eliminating, or at least inhibiting, the formation of moisture in the gap during periods of changing atmospheric pressure and temperature. The use of particular grooved patterns, stated as a ratio of the area of plateau to combined plateau and grooved area, is employed to reduce surface eruption and cratering caused by repeated firings.

While such electrodes offer a material advantage in terms of longevity as compared to conventional flat-surfaced electrodes, the grid-like patterns employed do not provide the best venting of loose particulate material. Additionally, the molding of relatively complex patterns on the exposed operative surfaces of the electrode is a difficult manufacturing operation, and breakage rates are correspondingly high. The venting of such patterns is usually not along straight lines, and maximum possible venting action is therefore not obtained.

RELATED APPLICATION

Reference is made to the co-pending application of William V. Carney, Ser. No. 945,774, filed on or about Sept. 25, 1978 entitled Electrode for Telephone Protector Modules, said application having been assigned to the same assignee as the instant application.

SUMMARY OF THE INVENTION

Briefly stated, the invention contemplates the provision of an improved carbon electrode of the class described, in which the operative end surface is provided with a plurality of pie-shaped sectors forming lands or raised surfaces radially extending from a central axis. The sectors are separated by radially oriented grooves, the outer ends of which extend to the peripheral edge of the end surface, and the inner ends of which merge with a centrally disposed generally circular recess of depth equivalent to that of the merging grooves. The peripheral border of the recess is chamfered to facilitate the flow of hot expanding gasses upon firing, and to avoid the necessity of forming relatively sharp edges during manufacture. The elimination of the axially disposed bore disclosed in the above mentioned co-pending application facilitates the molding of the electrode, and thereby materially lessens the cost of manufacture, without loss in functional efficiency. The embodiments disclosed herein are particularly useful in that form of protector module which does not use a spring-loaded component actuated by the occurence of excessive heat within the module. In such constructions, the spring-loaded component includes, in many designs, a part which penetrates the electrode to provide a positive mechanical short upon the occurrence of a period of sustained arcing. Where this component is eliminated, the need for the central bore is correspondingly avoided. However, the venting action obtained by the presence of the axial bore must be replaced. The present disclosure relates to a configuration which provides equivalent venting efficiency in the absence of such bore.

As is the case in the above mentioned application, the apex of each pie-shaped sector is located adjacent the center of the centrally disposed recess. Although the surfaces of each sector are formed to lie generally in a common plane, minute commercial tolerances allow one portion of one sector to be initially positioned closer to the oppositely disposed carbon electrode. The sector which is closer to the other electrode will receive the electric arc during a first firing, thus eroding the surface of this sector. During the next cycle of firing, the next closest sector will receive the arc and also erode. With repeated firings, the sectors will erode to approximately the same degree, and a commutating effect is thereby achieved.

In a disclosed second embodiment, the centrally disposed recess is partially filled by a raised projection, the upper surface of which is in co-planar relation with the pie-shaped sectors, to form another plateau capable of receiving an arc. This area will erode with continued firing, and is capable of venting to any or all of the radially arranged grooves which emanate therefrom.

BRIEF DESCRIPTION OF THE DRAWING

In the drawing, to which reference will be made in the specification, similar reference characters have been employed to designate corresponding parts throughout the several views:

FIG. 1 is an exploded view in perspective of a first embodiment of the invention.

FIG. 2 is an end elevational view of a carbon electrode forming a part of the first embodiment.

FIG. 3 is a side-elevational view thereof.

FIG. 4 is a central longitudinal sectional view thereof.

FIG. 5 is an end elevational view of a carbon electrode forming a part of a second embodiment of the invention.

DETAILED DESCRIPTION OF THE ENCLOSED EMBODIMENT

In accordance with the invention the device, generally indicated by reference character 10, is normally contained within a suitable housing (not shown) of well-known type and, as seen in FIG. 1, includes a ceramic sleeve 11, mounting an elongated carbon electrode 12. The sleeve 11 includes an end surface 13 which is parallel to the end surface 14 of the electrode 12 and forms an air gap 15 with respect to an abutted second electrode 16 having an end surface 17 which is thereby positioned opposite the surface 14. A metal disk 18 or other suitable conductor abuts an opposite surface 19 of the second electrode 16. As this construction is well-known in the art, it need not be further considered in detail in the present disclosure.

Referring to FIG. 2 in the drawing, the second electrode 16 is of conventional overall configuration, i.e. a short solid cylinder, and is bounded by a cylindrical side surface 20 and first and second end surfaces 17 and 19, respectively. A centrally positioned blind circular recess 21 extends from the surface 17.

A plurality of generally planar pie-shaped sectors 23, 24, 25, 26, 27, 28, 29 and 30, are delineated by the corresponding plurality of radially extending grooves 31 which are preferably of V-shaped cross-section. Each groove is substantially similar, including first and second surfaces 32 and 33, and terminating at an inner end where it communicates with the recess 21 and an outer end 35 where it meets the side surface 20. The arcuate border 22 of the recess 21 is chamfered to facilitate molding procedures.

While the exact dimensions are not critical, I have found that using conventional air gap distances of 0.020 inch, and a conventional outer diameter of the second electrode of approximately 0.313 to 0.322 inch, a suitable diameter for the central bore is approximately 0.084 inch in diameter, plus or minus 0.004 inch. The grooves are typically of 60° configuration, and have a nominal depth of 0.020 inch as does the recess 21, where the total axial thickness of the electrode is approximately 0.125 inch.

Turning now to the second embodiment of the invention, illustrated in FIG. 5, parts corresponding to those of the first embodiment have been designated by similar reference characters with the additional prefix "1."

In the second embodiment, an additional plateau area has been provided in the center of recess 121 of a height such that the upper surface thereof lies in co-planar relation with the sectors 123–130, whereby the recess 131 forms a generally annular groove.

The plateau area 136 thus serves as an additional arcing surface, which when fired, may vent to any or all of the grooves 131.

I wish it to be understood that I do not consider the invention limited to the precise details of structure shown and set forth in this specification, for obvious modifications will occur to those skilled in the art to which the invention pertains.

I claim:

1. In a telephone line protective device, including a pair of spaced electrodes and an insulating sleeve mounting one of said electrodes and forming an inner gap between said pair of electrodes, the improvement comprising: one of said opposed surfaces having a plurality of radially arranged grooves extending into the surface thereof, to define a corresponding plurality of pie-shaped sectors therebetween; said electrode having a principle longitudinal axis, there being a centrally disposed blind curvilinear recess in said one of said opposed surfaces, and communicating at the periphery thereof with said radially arranged grooves; whereby during arcing between said opposed surfaces, venting of expanding gases may be transmitted over said recess to flow along each of said grooves, irrespective of which of said pie-shaped surfaces receives the arc.

2. The improvement as set forth in claim 1, further characterized in said circular recess being bounded by chamfered surfaces.

3. The improvement as set forth in claim 1, further characterized in the provision of a centrally disposed axially projecting plateau area in the center of said curvilinear recess.

4. The improvement as set forth in claim 3, further characterized in the surface of said plateau area being substantially coplanar with a surface of said pie-shaped sectors.

* * * * *